(12) United States Patent
Waldner et al.

(10) Patent No.: US 11,312,225 B2
(45) Date of Patent: Apr. 26, 2022

(54) POWER TRAIN FOR PUMPS, ENERGY GENERATION SYSTEMS OR SIMILAR AND METHOD FOR STARTING UP A POWER TRAIN OF THIS TYPE

(71) Applicant: SET SUSTAINABLE ENERGY TECHNOLOGIES GMBH, Klagenfurt am Woerthersee (AT)

(72) Inventors: Markus Waldner, Klagenfurt (AT); Gerald Hehenberger, Klagenfurt (AT); Miha Erjavec, Ravne na Koroskem (SI)

(73) Assignee: SET SUSTAINABLE ENERGY TECHNOLOGIES GMBH, Klagenfurt am Woerthersee (AT)

( * ) Notice: Subject to any disclaimer, the term of this patent is extended or adjusted under 35 U.S.C. 154(b) by 0 days.

(21) Appl. No.: 16/881,671

(22) Filed: May 22, 2020

(65) Prior Publication Data
US 2020/0282820 A1    Sep. 10, 2020

Related U.S. Application Data

(62) Division of application No. 15/569,017, filed as application No. PCT/AT2016/000040 on Apr. 25, 2016, now Pat. No. 10,661,649.

(51) Int. Cl.
*B60K 6/365*    (2007.10)
*F03D 15/00*    (2016.01)
(Continued)

(52) U.S. Cl.
CPC ............. *B60K 6/365* (2013.01); *B60K 6/387* (2013.01); *B60K 6/48* (2013.01); *F03D 15/00* (2016.05);
(Continued)

(58) Field of Classification Search
CPC .......... B60K 6/365; B60K 6/387; B60K 6/48; B60K 2006/268; B60K 2006/4825;
(Continued)

(56) References Cited

U.S. PATENT DOCUMENTS 4,774,855 A    10/1988  Murrell et al.
5,433,282 A    7/1995   Moroto et al.
(Continued)

FOREIGN PATENT DOCUMENTS

AT    507394 A2    4/2010
AT    511 720 B1   2/2013
(Continued)

OTHER PUBLICATIONS

International Search Report, dated Sep. 19, 2016, from corresponding PCT application No. PCT/AT2016/000040.
(Continued)

*Primary Examiner* — Justin Holmes
(74) *Attorney, Agent, or Firm* — Nixon & Vanderhye

(57) ABSTRACT

Disclosed is a power train including a drive shaft of a working machine, a drive machine and a differential gear with three drives or power take-offs, wherein one power take-off can be connected to the drive shaft, a first drive can be connected to the drive machine and a second drive can be connected to the differential gear. One drive can be connected simultaneously to the other drive or to the power take-off.

20 Claims, 12 Drawing Sheets

Figure 1:
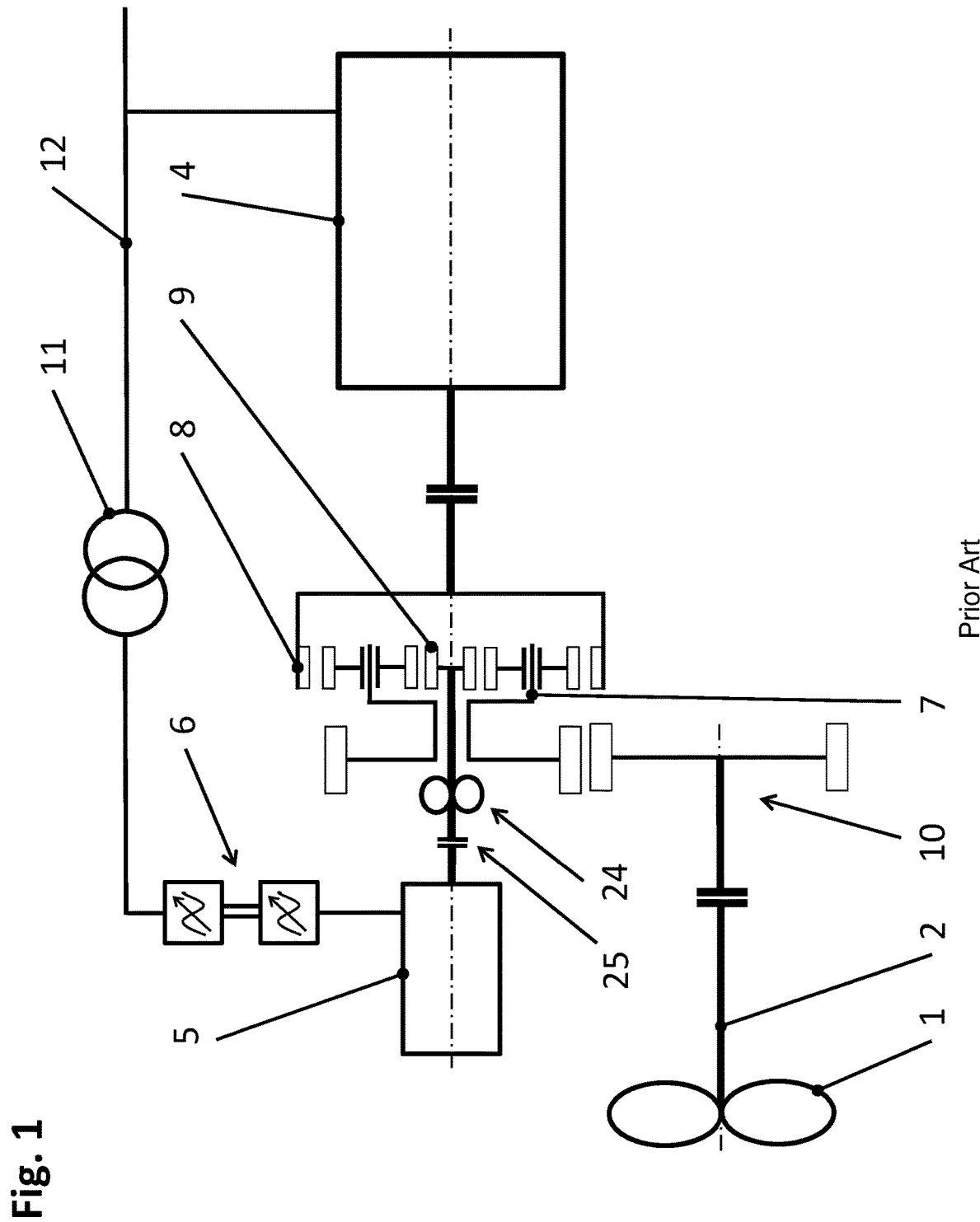

(51) Int. Cl.
  *B60K 6/387* (2007.10)
  *B60K 6/48* (2007.10)
  *F16H 3/72* (2006.01)
  *H02P 5/753* (2006.01)
  *B60K 6/26* (2007.10)
  *H02K 7/116* (2006.01)

(52) U.S. Cl.
  CPC ............ *F16H 3/724* (2013.01); *H02P 5/753* (2013.01); *B60K 2006/268* (2013.01); *B60K 2006/4825* (2013.01); *B60K 2006/4833* (2013.01); *F05B 2260/40311* (2013.01); *H02K 7/116* (2013.01); *Y02E 10/72* (2013.01); *Y02T 10/62* (2013.01)

(58) Field of Classification Search
  CPC .... B60K 2006/4833; B60K 2006/4816; F03D 15/00; F16H 3/724; F16H 3/72; H02P 5/753; Y02E 10/72; Y02T 10/62; F05B 2260/40311; H02K 7/116; Y02B 10/30
  See application file for complete search history.

(56) References Cited

U.S. PATENT DOCUMENTS

| | | | |
|---|---|---|---|
| 6,811,508 | B2 | 11/2004 | Tumback |
| 7,458,910 | B2 | 12/2008 | Besnard et al. |
| 8,790,203 | B2 | 7/2014 | Hehenberger |
| 9,958,049 | B1 | 5/2018 | Sten et al. |
| 10,661,649 | B2 * | 5/2020 | Waldner ................ F16H 3/724 |
| 2003/0100395 | A1 | 5/2003 | Hiraiwa |
| 2009/0071733 | A1 | 3/2009 | Duan et al. |
| 2011/0229324 | A1 | 9/2011 | Hehenberger |
| 2015/0360553 | A1 * | 12/2015 | Hung ................ B60K 6/365 180/65.23 |
| 2016/0091061 | A1 | 3/2016 | Erjavec et al. |
| 2016/0101679 | A1 * | 4/2016 | Kim ................ F16H 57/0421 475/5 |
| 2016/0375754 | A1 * | 12/2016 | Kurosaki ............... B60K 6/445 475/5 |
| 2019/0118800 | A1 * | 4/2019 | Cho ...................... B60W 20/50 |

FOREIGN PATENT DOCUMENTS

| | | |
|---|---|---|
| AT | 511720 A4 | 2/2013 |
| AT | 514396 A1 | 12/2014 |
| DE | 1151860 B | 7/1963 |
| DE | 1259164 B | 1/1968 |
| DE | 3640146 A1 | 6/1988 |
| DE | 197 51 231 A1 | 6/1999 |
| DE | 10 2006 058 003 A1 | 6/2008 |
| DE | 202012101708 U1 | 8/2012 |
| EP | 1 801 386 A1 | 6/2007 |
| EP | 2 646 711 B1 | 11/2014 |
| JP | 2013-86654 A | 5/2013 |
| SU | 1007172 | 3/1983 |
| SU | 1471013 | 4/1989 |
| WO | 2011/000008 A1 | 1/2011 |

OTHER PUBLICATIONS

Russian Office Action for Application No. 2017140924 dated Apr. 25, 2016.
Office Action issued in the corresponding European Patent Application No. 16 724 578.6 dated Mar. 10, 2021.
Search Report issued in Austrian Patent Application No. A 253/2015 dated Apr. 15, 2016.
Search Report issued in Austrian Patent Application No. A 643/2015 dated Apr. 20, 2016.

* cited by examiner

POWER TRAIN FOR PUMPS, ENERGY GENERATION SYSTEMS OR SIMILAR AND METHOD FOR STARTING UP A POWER TRAIN OF THIS TYPE

The invention relates to a power train and a method for starting up a power train.

BACKGROUND OF THE INVENTION

A general problem of driven machines, such as conveyor apparatuses, for example pumps, compressors and fans, or such as pulverizers, crushers, motor vehicles, etc., is efficient, variable-speed operation or starting up under load, or operation of, for example, energy extraction installations up to a speed equal to zero. Furthermore, electrical machines are used as an example of drive machines or generators, but the principle applies to all possible types of drive machines, as well as to, for example, internal combustion engines.

The electrical drives and generators that are most frequently used at present are three-phase machines, such as, for example, asynchronous machines and synchronous machines that are operated essentially only with constant speed. Moreover, a three-phase machine and a network downstream of it must be designed to be correspondingly large so that they can deliver a desired driving torque from a standstill. Therefore, electrical machines for this reason will also instead be connected directly to a power system, often made in combination with a frequency converter as a variable-speed drive. Thus, variable-speed operation from speed zero can be implemented without heavily loading the power system, but the approach is expensive and linked to major efficiency losses. One more economical alternative that is better in comparison and also better in efficiency is the use of differential systems—for example according to AT 507 394 A. The basic limitation here is, however, that depending on the transmission ratio of the differential stage, only a relatively smaller speed range can be achieved, and therefore in the so-called differential mode, i.e., in the case of the speed changes using the differential drive at the operating speed of the drive machine, essentially lower speeds on the drive shaft of a driven machine cannot be achieved.

There are several possibilities for doing this. According to DE 20 2012 101 708 U, for example, the transmission ratio of the differential gear can be fixed at 1. On this basis, the complete power train can be driven with the differential drive or the drive machine can be brought to synchronous speed and can be subsequently synchronized with the power system.

The disadvantage of this approach is that the differential drive and the frequency converter downstream of it are dimensioned to be much smaller than the drive machine and therefore can also only deliver a correspondingly small torque. This is not enough to accelerate the drive machine to the synchronous speed when the driven machine is in operation.

AT 514 396 A shows an approach with which drive machines can be accelerated into a speed range with high torque and the driven machine can be started up in a further step away from speed zero. This is done by the drive machine being started up from a speed of zero or roughly zero while an external braking torque acts on the drive shaft, and by the second drive being braked in an acceleration phase of the drive shaft. The disadvantage of this approach is that the braking device that is necessary for this purpose is complex and with a differential drive in a size on the order of, for example, 20% of the total system output, only a continuous speed range of roughly 50% to 100% of the working speed can be implemented.

BRIEF SUMMARY OF THE INVENTION

The object of the invention is therefore to find an approach with which drive machines can be accelerated preferably under load, for example in order to synchronize with the power system electrical machines coupled, for example, directly to a power system, and a large working speed range can be implemented.

This object is achieved with a power train with the features of Claim 1.

This object is furthermore achieved with a method with the features of Claim 8.

The heart of a differential system is a differential gear that in a simple embodiment can be a simple planetary gearing stage with three drives and power take-offs, one power take-off being connected to the drive shaft of a driven machine, a first drive being connected to a drive machine and a second drive being connected to a differential drive. Thus, the driven machine can be operated in a variable speed manner at constant speed of the drive machine, the differential drive enabling a variable speed of the drive shaft.

In order to start a driven machine from a standstill, and if the drive machine is an electrical machine, additionally to bring a drive machine from a standstill preferably to synchronous speed, the system can be operated according to the invention, for example, in the following three phases:

Phase 1: A differential drive is connected at a standstill both to the first drive and also to the second drive of the differential system. Then, the differential drive is accelerated, and the driven machine begins to work. Depending on the torque characteristic of the driven machine and the output of the differential drive, in this operating mode I preferably a working speed range of up to roughly 40%-50% of the nominal working speed of the driven machine is implemented. The drive machine remains in this operating mode I separated from the power system. The transmission ratios of the gear stages via which the differential drive is connected to the two drives are preferably chosen such that the drive machine at least approximately reaches its operating speed as soon as the differential drive enters the vicinity of its power limit. The differential drive works in the motor mode in this phase—i.e., it takes power from the power system.

Phase 2: The drive machine that is connected to the first drive of the differential system and that is now running in the operating speed range is connected to the power system at this point. Since the differential drive works in the generator mode in the lower working speed range of operating mode II—i.e., it delivers power into the power system—in the next step the torque of the differential drive is adjusted from the motor mode into the generator mode. In this way, the drive machine is continuously more and more heavily loaded until the entire differential system preferably enters the region of the lower limit of the working speed range of operating mode II.

In order to keep the system loads as small as possible, preferably the transition from the motor mode to the generator mode of the differential drive takes place damped, i.e., not suddenly.

Phase 3: As soon as an operating point in the lower working speed range of operating mode II has been set on the differential drive and on the drive machine with respect to speed and torque, the differential drive is separated from the first drive of the differential system. The system now works in the differential mode with which in this third phase for the driven machine, a maximum torque at maximum driving speed can be implemented.

BRIEF DESCRIPTION OF THE SEVERAL VIEW OF THE DRAWINGS

Figure 2:
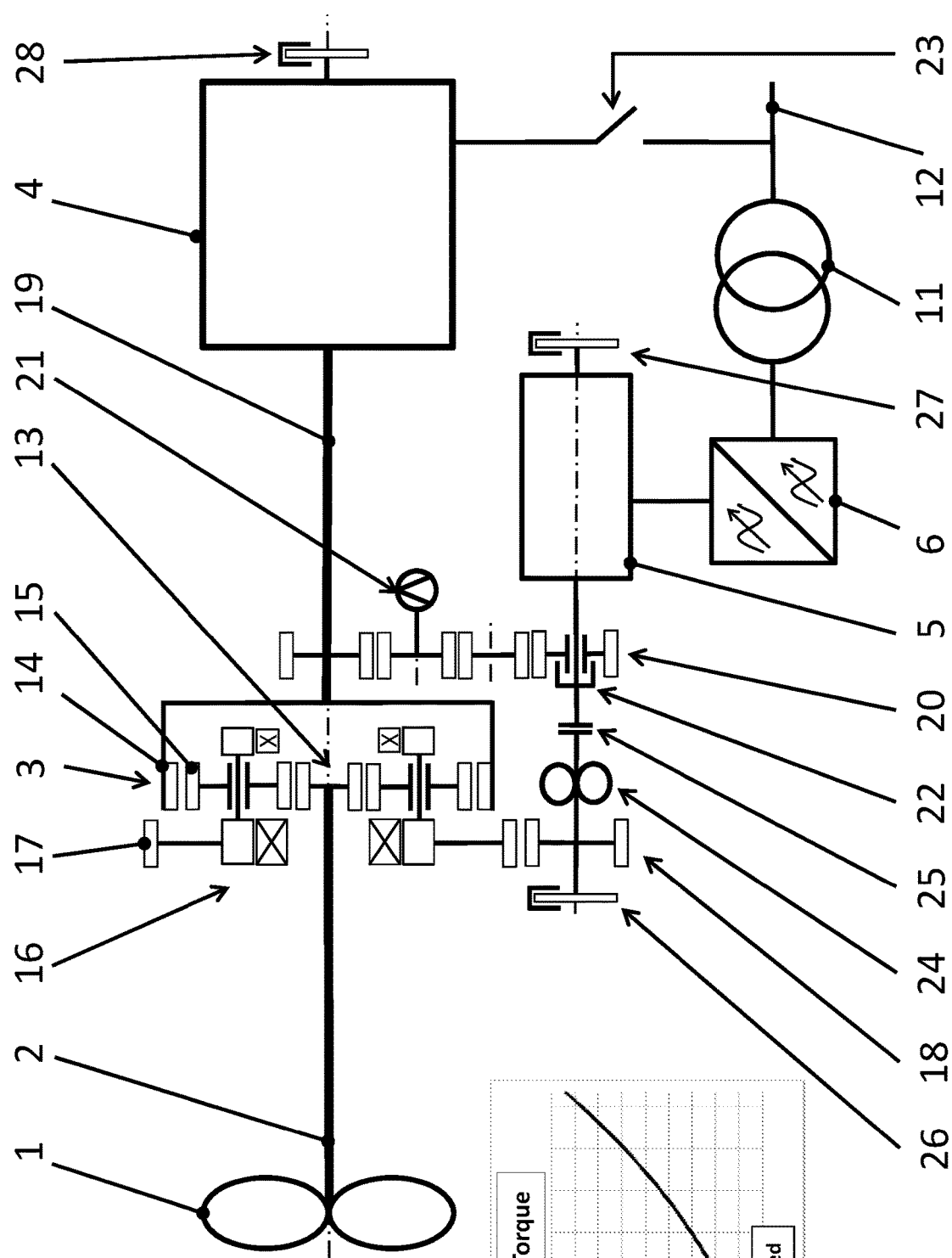
Figure 2A:
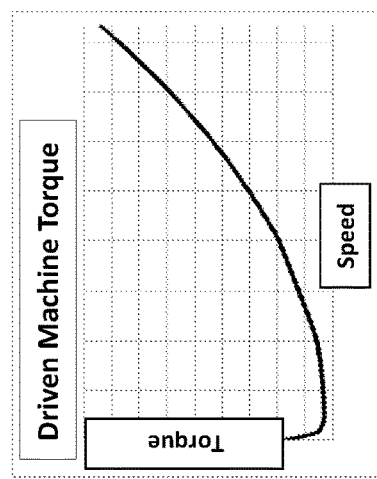
Figure 3:
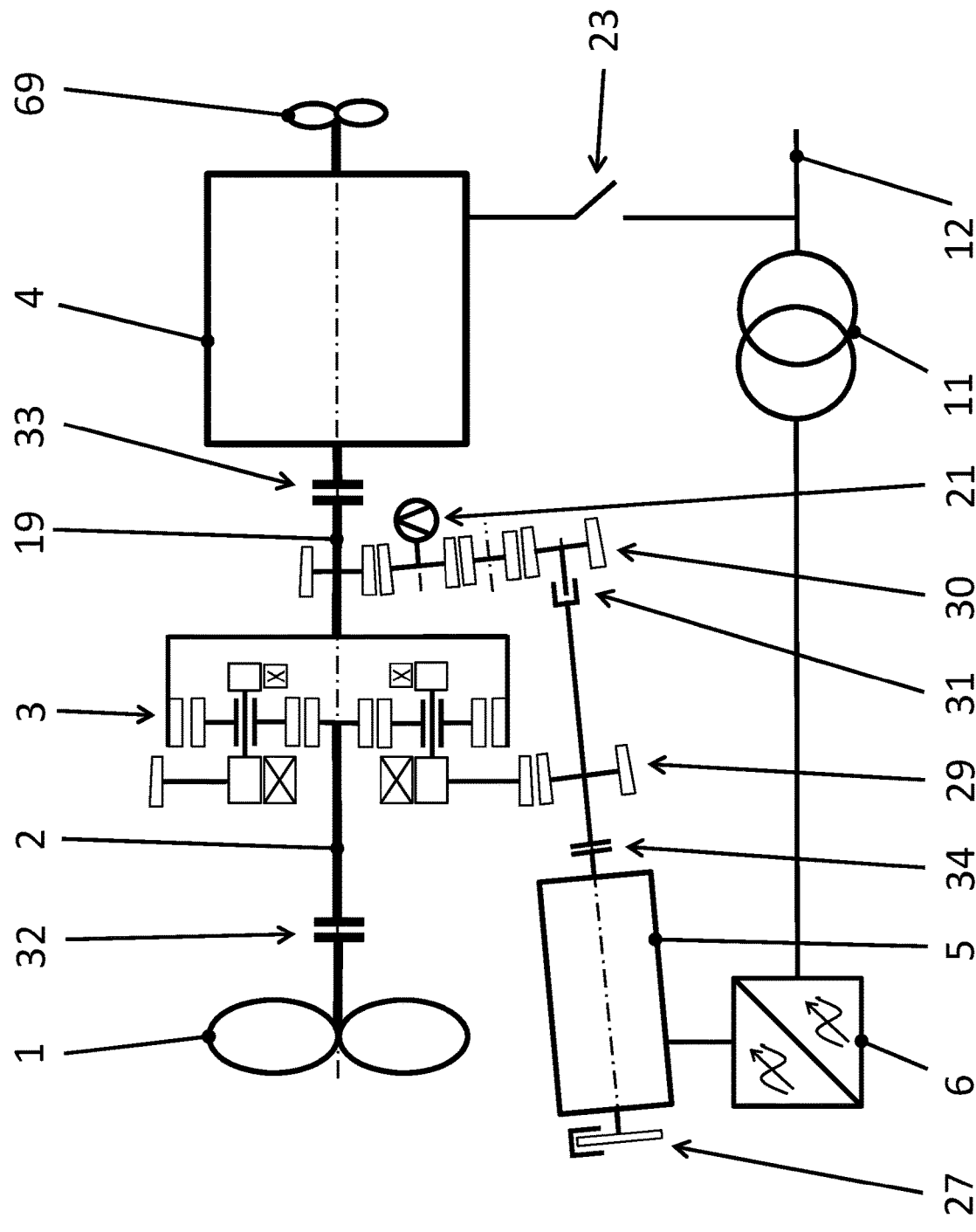
Figure 4:
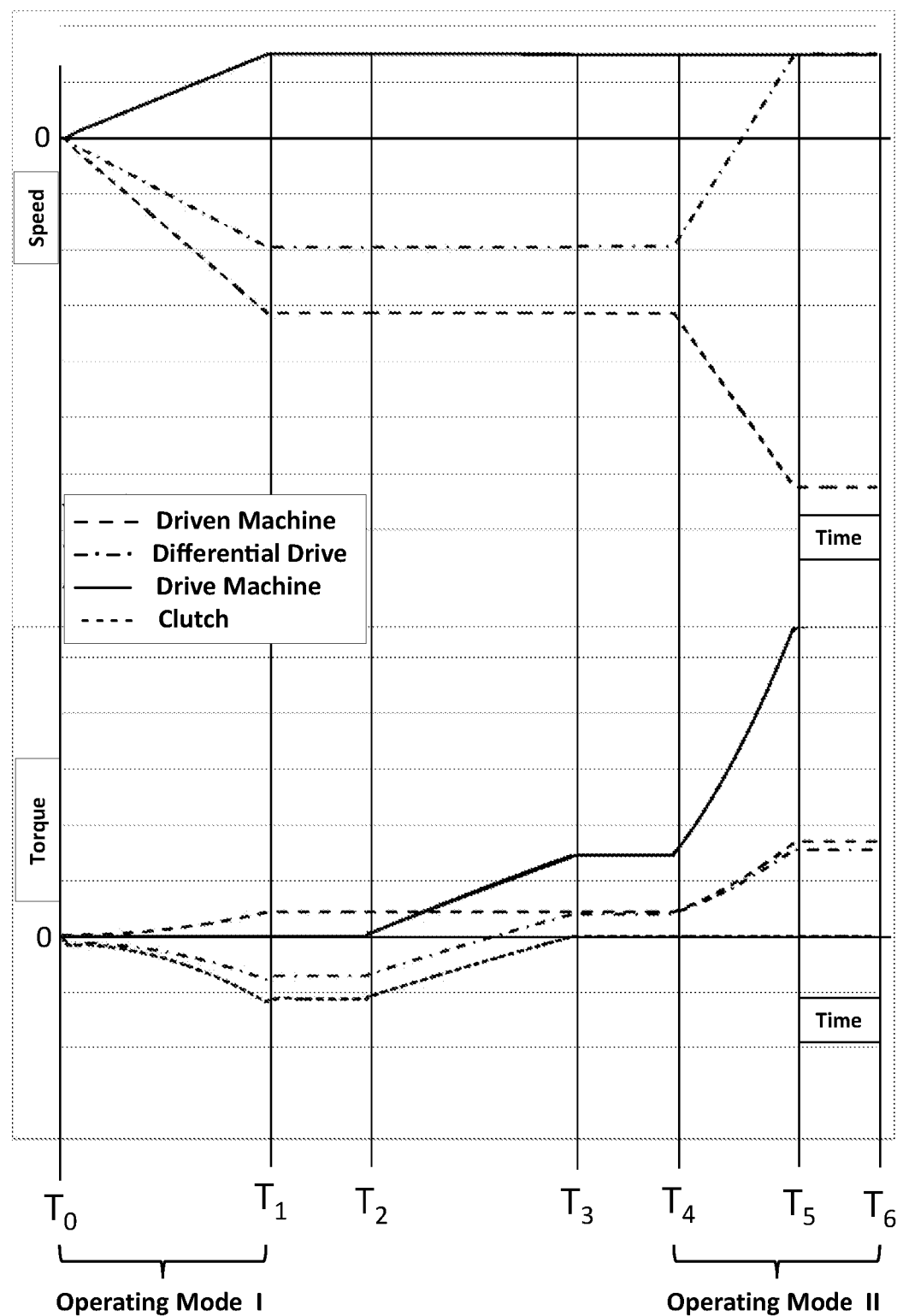
Figure 5:
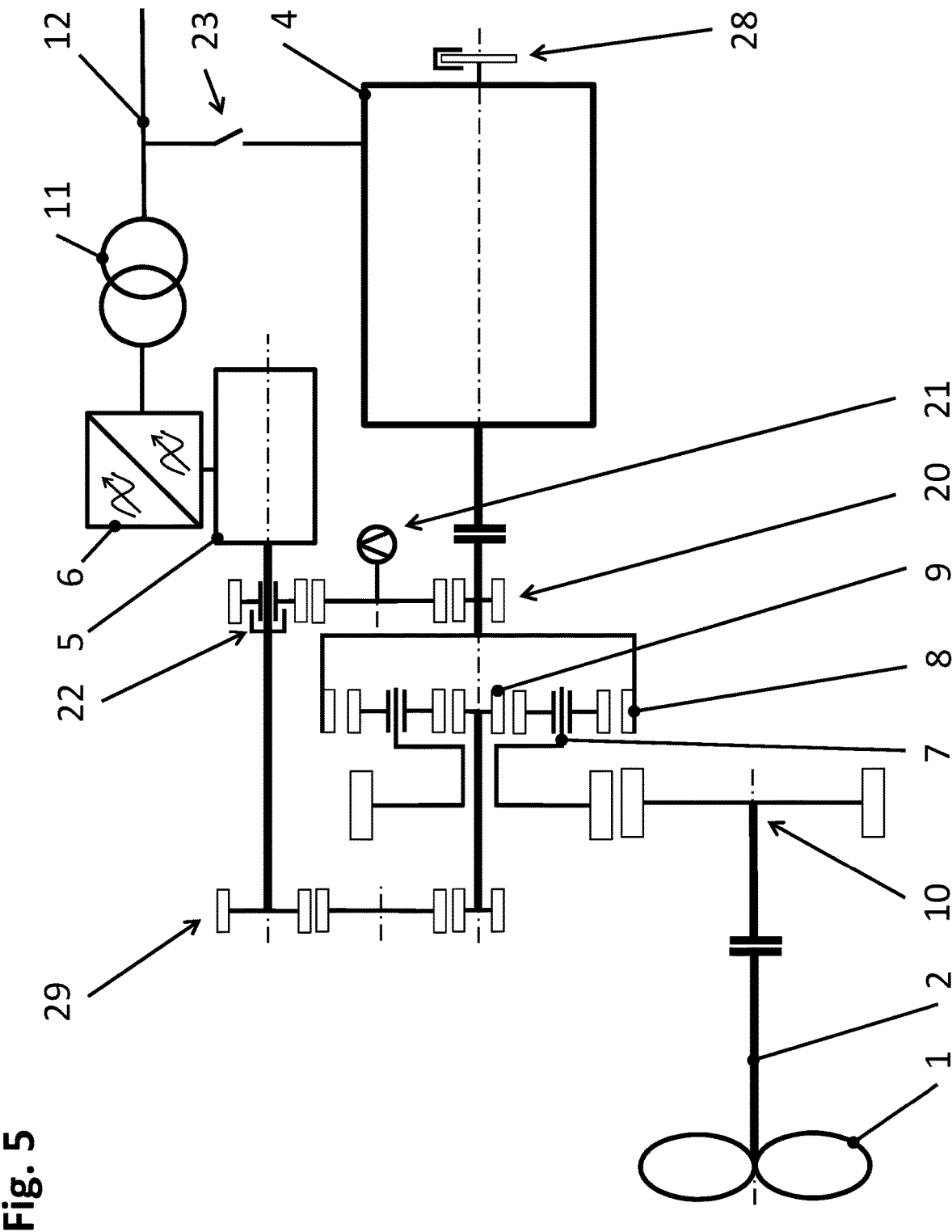
Figure 6:
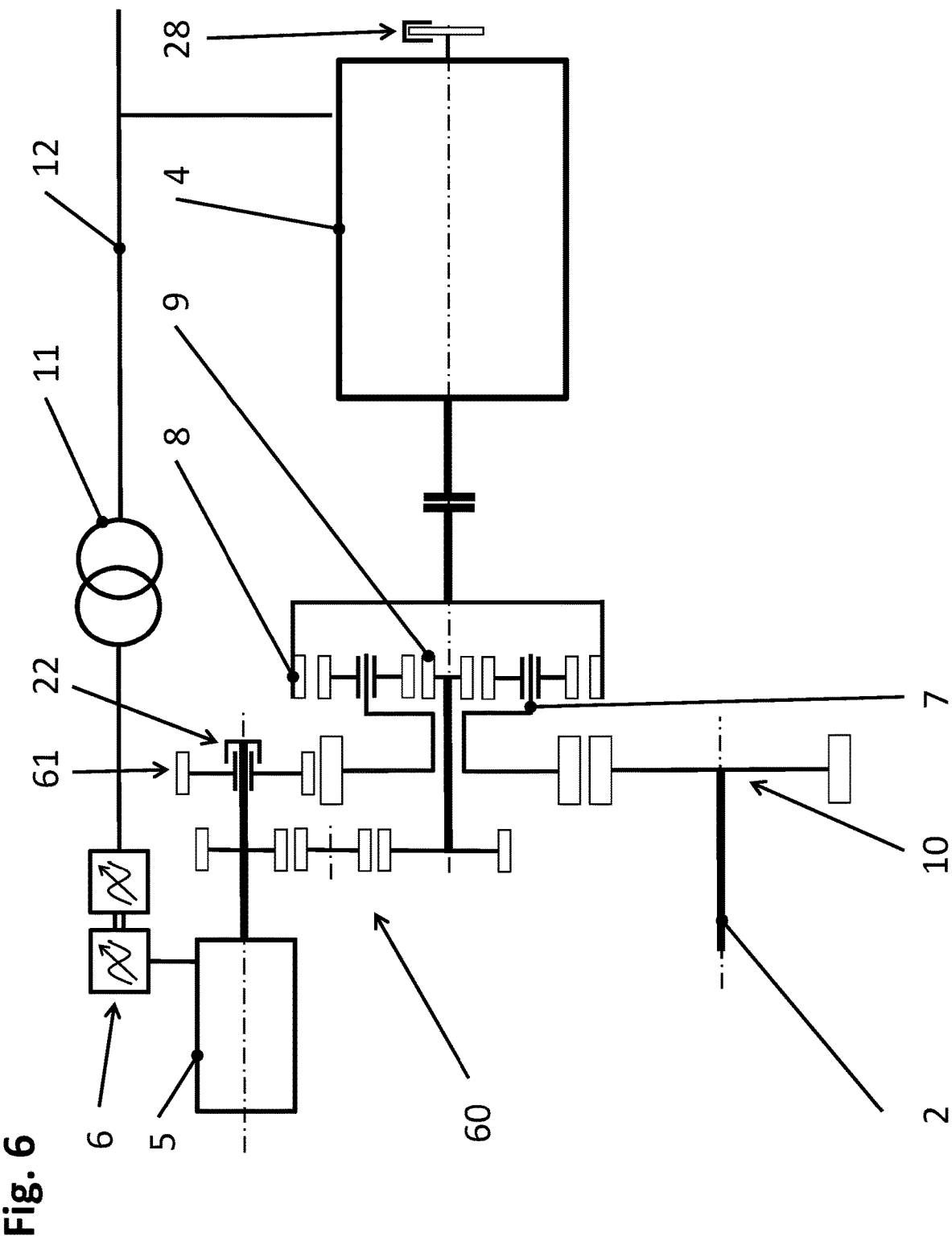
Figure 7:
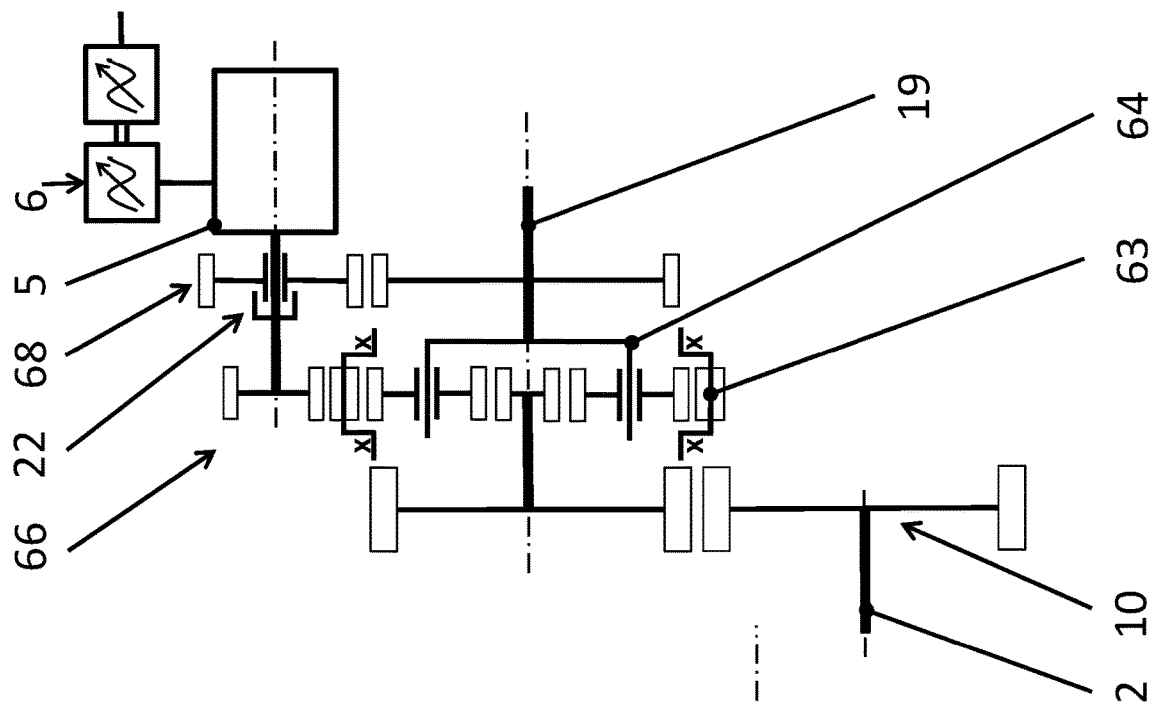
Figure 8:
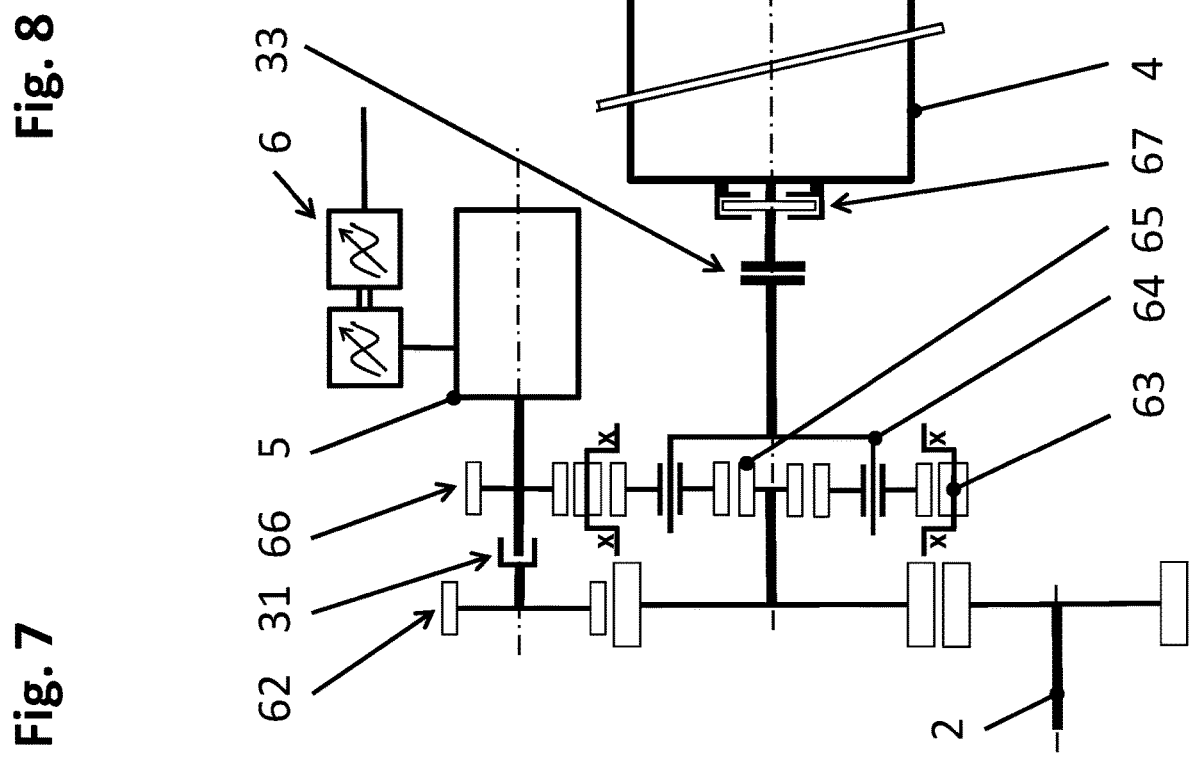
Figure 9:
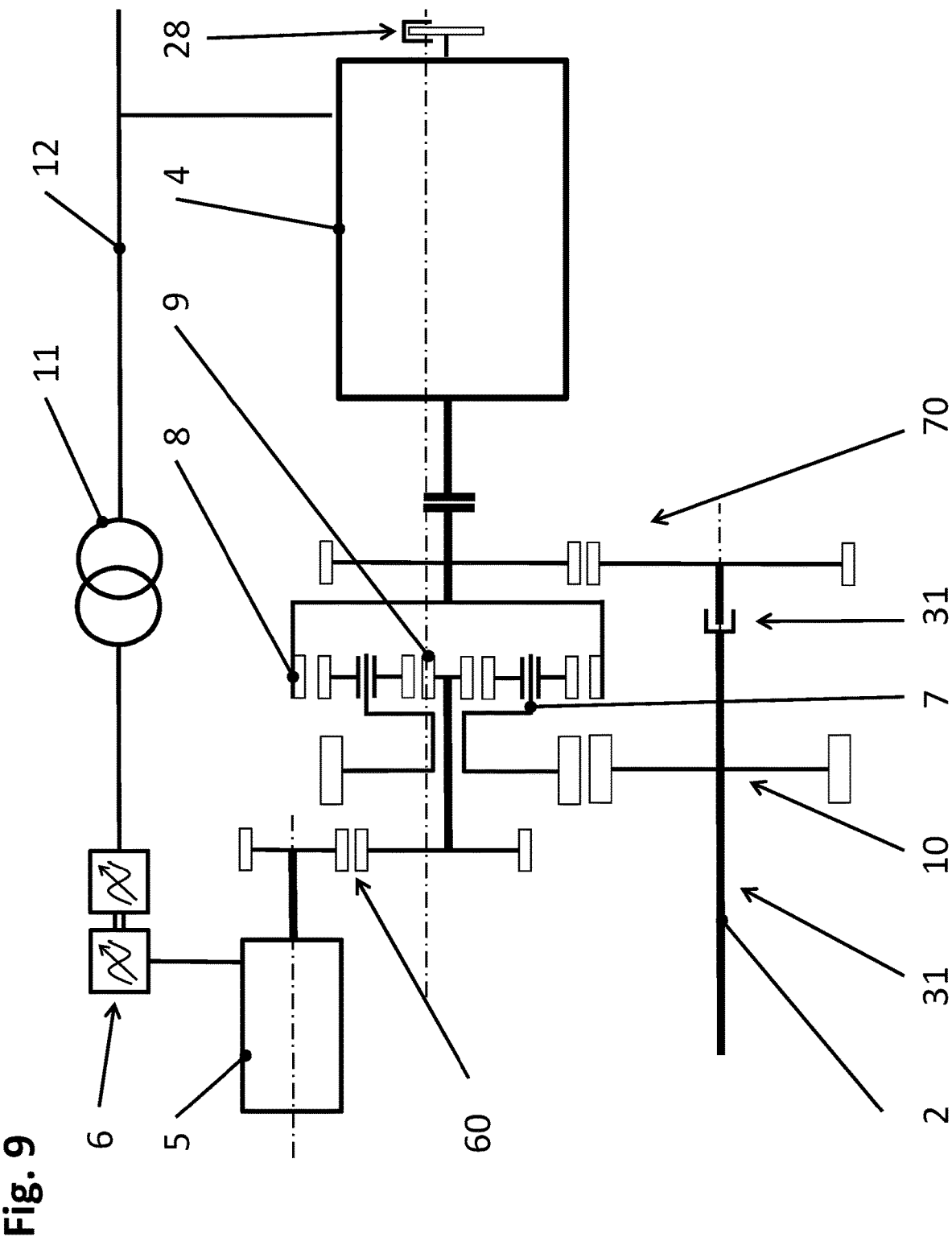
Figure 10:
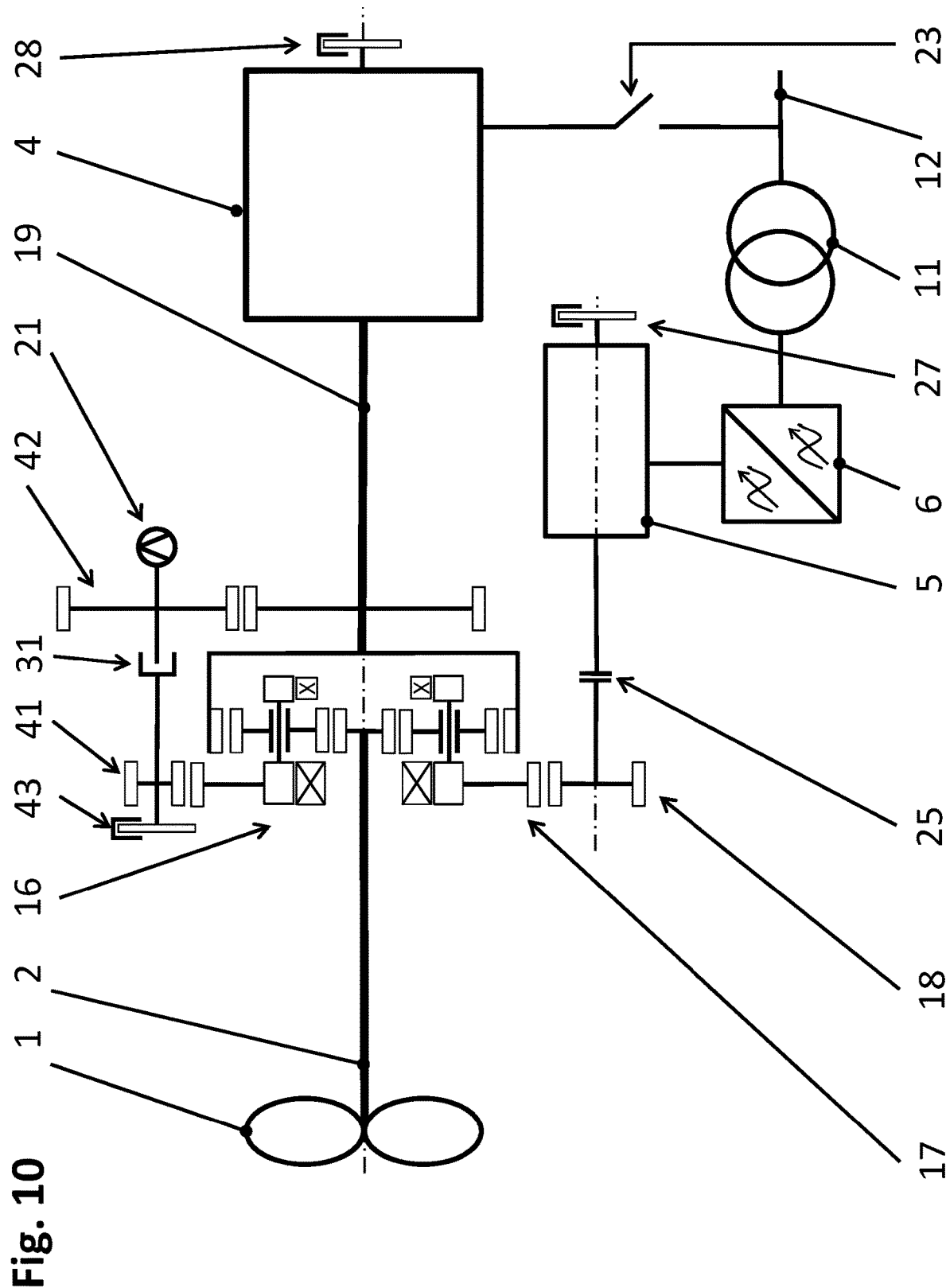
Figure 11:
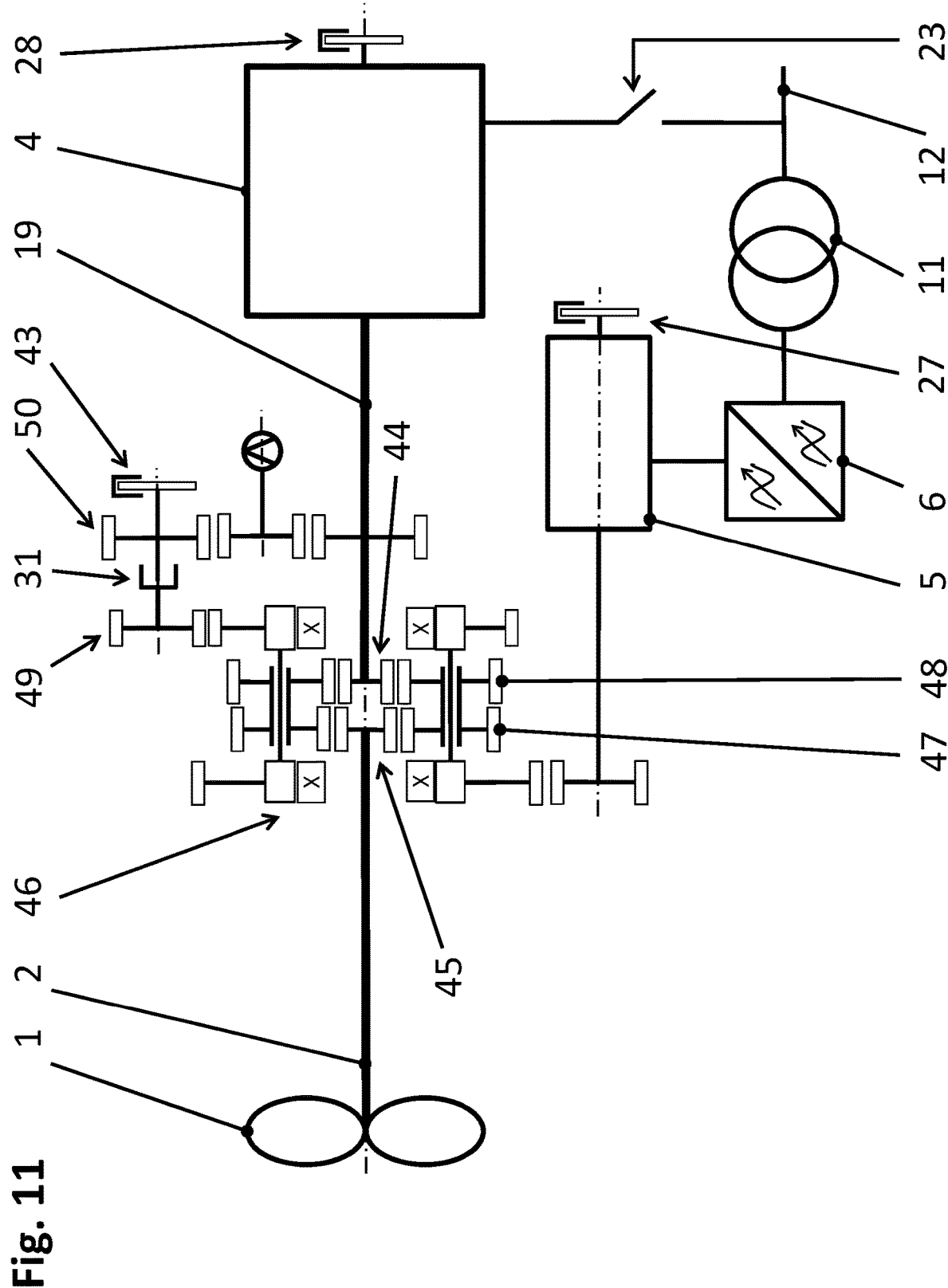
Figure 12:
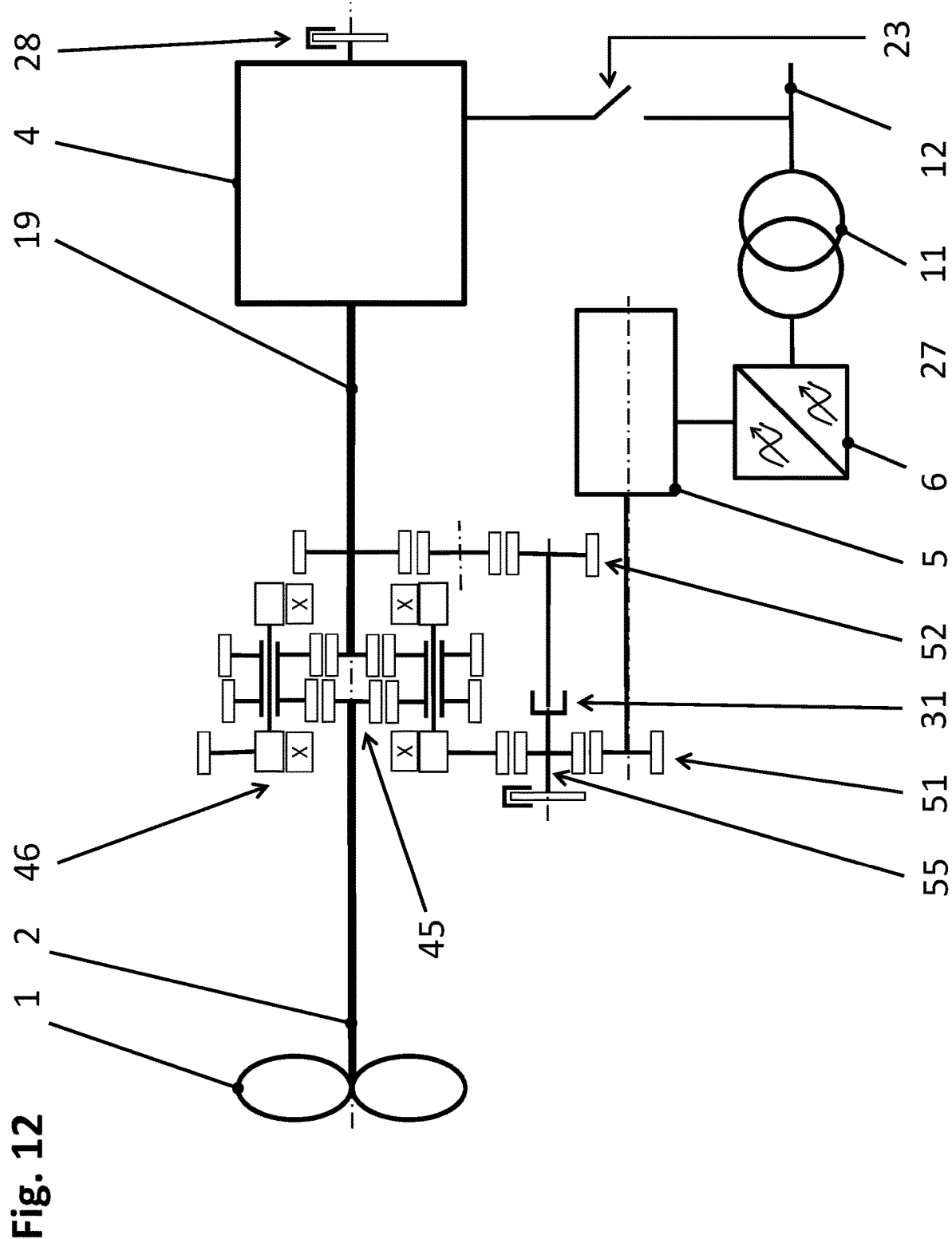
Figure 13:
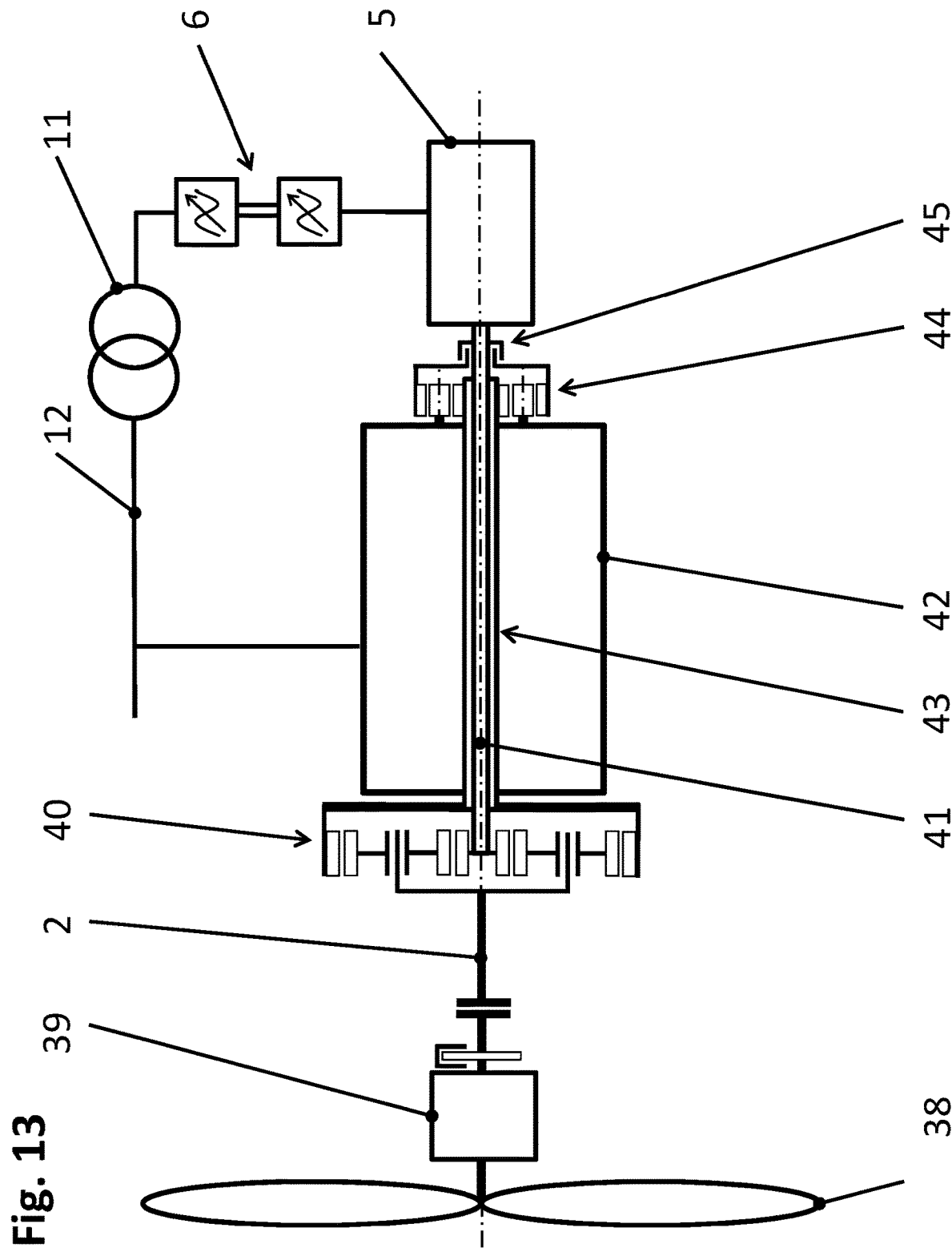

Preferred embodiments of the invention are explained below with reference to the attached drawings. Here:

FIG. 1 shows the principle of a differential system for a drive of a pump according to the state of the art, FIG. 2 shows an embodiment of a differential system according to the invention for high-speed drives, FIG. 2a shows a diagram with a typical torque characteristic of a pump, FIG. 3 shows another embodiment of a differential system according to the invention for high-speed drives, FIG. 4 shows a time characteristic of the speed parameters and power parameters of a differential system during start-up, FIG. 5 shows an embodiment of a differential system according to the invention for slow-speed drives, FIG. 6 shows another embodiment according to the invention, in which a differential drive can be connected to a second drive and a power take-off of a differential system, FIG. 7 shows another embodiment according to the invention, in which a differential drive 5 of a differential system is connected to the second drive and can be connected to the power take-off, FIG. 8 shows another embodiment according to the invention, in which a differential drive 5 of a differential system is connected to the second drive and can be connected to the power take-off, FIG. 9 shows another embodiment according to the invention, in which a power take-off can be connected to a first drive of a differential system, FIG. 10 shows another embodiment according to the invention, in which a differential drive can be connected via a second drive to a first drive of a differential system, FIG. 11 shows an embodiment of a differential system according to the invention with a positive gear, FIG. 12 shows another embodiment of a differential system according to the invention with a positive gear, and FIG. 13 shows another embodiment of a differential system according to the invention for an energy extraction installation.

DETAILED DESCRIPTION OF THE INVENTION

FIG. 1 shows the principle of a differential system for a power train using the example of a pump. Here, the driven machine 1 is the symbolically-shown rotor of a pump, which is driven by a drive machine 4 via a drive shaft 2 and a differential gear 7 to 9. The drive machine 4 is preferably a medium-voltage three-phase machine, which is connected to a power system 12, which in the illustrated example based on a medium-voltage three-phase machine is a medium-voltage power system. The chosen voltage level depends on the application and mainly the power level of the drive machine 4 and can have any desired voltage level, without influence on the basic function of the system according to the invention. According to the number of pole pairs of the drive machine 4, there is a design-specific working speed range. The working speed range is that speed range in which the drive machine 4 can deliver a defined or desired or required torque and in which the drive machine 4 in the case of an electrical drive machine can be synchronized with the power system 12, or in the case of an internal combustion engine can be started or operated. A planetary carrier 7 of the differential gear is connected to the drive shaft 2, the drive machine 4 is connected to an internal gear 8, and a sun gear 9 of the differential gear is connected to a differential drive 5. The differential drive 5 is preferably a three-phase machine and in particular an asynchronous machine or a permanent magnet-excited synchronous machine.

Instead of the differential drive 5, a hydrostatic actuating gear can also be used. Here, the differential drive 5 is replaced by a hydrostatic pump/motor combination that is connected to a pressure line and that are both adjustable preferably in the flow volume. Thus, as in the case of a variable-speed electrical differential drive 5, the speeds can be adjusted.

The core of the differential system in this embodiment is thus a simple planetary gear stage with three drives and power take-offs, one power take-off being connected to the drive shaft 2 of the driven machine 1, a first drive being connected to the drive machine 4 and a second drive being connected to the differential drive 5.

In order to be able to optimally match the speed range of the system, a matching gear 10 is implemented between the planetary carrier 7 and the driven machine 1. Alternatively to the illustrated spur gear stage, the matching gear 10 can be designed, for example, also multistage or as toothed belt or chain drive and/or can be combined with a planetary gear stage or a bevel gear stage. With the matching gear 10, an axial offset can, moreover, be implemented for the driven machine 1 that enables a coaxial arrangement of the differential drive 5 and of the drive machine 4. Electrically, the differential drive 5 is linked to the power system 12 by means of a preferably low-voltage converter 6 and—if necessary—a transformer 11. An important advantage of this concept is that the drive machine 4 can be linked directly, i.e., without complex power electronics, to the power system 12. The equalization between variable rotor speed and fixed speed of the power system-linked drive machine 4 is implemented by the variable-speed differential drive 5.

The torque equation for the differential system is the following:

$$\text{Torque}_{\textit{differential drive}} = \text{torque}_{\textit{drive shaft}} * y/x.$$

The size factor y/x is a measurement of the transmission ratios in the differential gear 3 and in the matching gear 10. The torques on the power take-offs and drives are proportional to one another, as a result of which the differential drive 5 can control the torque in the entire power train. The power of the differential drive 5 is essentially proportional to the product from the percentage deviation of the speed of the driven machine 1 from its base speed, multiplied by the drive shaft output. In this case, the base speed is that speed that is set on the driven machine 1 when the differential drive 5 has a speed equal to zero. Accordingly, a large working speed range of the driven machine 1 requires corresponding large dimensioning of the differential drive 5. If the differential drive 5 has, for example, a nominal output of roughly 20% of the total system output (nominal output of the driven machine), this means, using a typical so-called field weakening region of the differential drive 5, that on the driven machine 1, minimum working speeds of roughly 50% of the nominal working speed can be implemented. This is also why differential drives according to the state of the art are especially well suited for small working speed ranges, but fundamentally, any working speed range is practicable. It can, however, be established that higher-pole three-phase machines on a standard basis allow generally higher overspeeds in relation to the synchronous speed; fundamentally, this enables (at the same nominal output of the differential drive 5) a greater working speed range of the driven machine 1 because a larger field weakening region of the differential drive 5 is possible.

To be able to start up the differential system from a speed equal to zero, the differential drive 5 is separably connected to the sun gear 9 by means of a clutch 25. A synchronization brake 24 acts on the second drive of the differential system and therefore on the sun gear 9 and thus on the entire power train. During start-up, in this embodiment of a differential system, in a first step, the differential drive 5 is decoupled from the remainder of the differential system by the clutch 25. If at this point the drive machine 4 is run up and connected to the power system 12, the sun gear 9 turns freely at the same time, and no noticeable torque can build up in the entire power train. Thus, the driven machine 1 in this case also remains in a low speed range, and the drive machine 4 can be connected to the power system 12 without noticeable external counter-torque.

As soon as the drive machine 4 is accelerated above a certain speed and the driven machine 1 is essentially standing still, on the sun gear 9, a high speed corresponding to the transmission ratio of the differential gear is established, which speed is generally above the allowed control speed range of the differential drive 5. The control speed range is the speed range in which the differential drive 5 works in order to be able to implement the working speed range of the driven machine 1. The control speed range is determined mainly by the voltage, current and speed boundaries that have been specified by the manufacturer.

The differential drive 5 in this embodiment cannot be connected to the sun gear 9 in this phase. In a further step, therefore, by means of the synchronization brake 24, the second drive of the differential system, which drive is connected to the sun gear 9, is slowed to a speed that lies in the control speed range of the differential drive 5. Depending on the implemented braking system 24 and the demands on the power train, this can take place both speed/torque-controlled and also -uncontrolled. Subsequently, the differential-gear-side part of the clutch 25 is preferably synchronized by means of the differential drive 5 with the speed of the second drive of the differential system, and then the clutch 25 is engaged.

By actuating the synchronization brake 24 (shown symbolically in FIG. 1 as a hydrodynamic brake) and thus by slowing down the second drive of the differential system, the drive shaft 2 is necessarily accelerated, the available torque being determined by the minimum from the braking force of the synchronization brake 24 acting on the drive shaft 2, on the one hand, and the breakdown torque of the drive machine 4, on the other hand.

FIG. 2 shows one embodiment of a differential system according to the invention that enables an oversynchronous working speed range without a matching gear. This embodiment is used preferably for high-speed driven machines. Here, the illustrated power train also has, as in FIG. 1, a driven machine 1, a drive shaft 2, a drive machine 4 and a differential drive 5 that are connected to the power take-offs and drives of a differential gear 3. The differential drive 5 is connected to a power system 12 by means of a converter 6 (consisting of preferably motor-side and power-system-side rectifier and inverter—here shown simplified as a unit) and a transformer 11. The drive machine 4 can be connected to the power system 12 by means of a switch 23.

Since, in the illustrated example, the driven machine 1 is operated with a speed that is distinctly above the synchronous speed of the drive machine 4, the drive shaft 2 is connected to the sun gear 13 and the drive machine 4 is connected to the internal gear 14 by means of a connection shaft 19. The differential drive 5 can be connected using the planetary carrier 16 to two or more planetary gears 15. Thus, a speed ratio between the drive machine 4 and driven machine 1 of, for example, 2.5 to 6.5 can be easily achieved with a planetary gear stage and without a matching gear. With, for example, a stepped planetary set, moreover, much higher transmission ratios can be achieved. A stepped planetary set is characterized in that the planetary gears 15 each have two gears that are connected torsionally strong to one another and have different pitch circle diameters, one gear interacting with the sun gear and the second gear interacting with the internal gear.

In FIGS. 1 to 3, 5 and 9 to 12, a pump is shown symbolically by way of example as a driven machine 1. The principles described here and for the following figures can, however, also be used in drives for driven machines, such as, for example, compressors, fans and conveyor belts, pulverizers, crushers, etc., or energy extraction installations and the like.

As a flow machine, a pump has a square torque characteristic on which during start-up, design-typical breakaway torques from the bearing system of the power train elements, etc., are superimposed. This leads to, first of all, a torque at the level of, for example, 10%-20% of the nominal torque of the driven machine 1 having to be overcome during start-up. With increasing speed, then the required driving torque drops (by elimination of the breakaway torque) and a torque is established that rises according to the working speed of the driven machine 1 (roughly quadratically) and that at nominal speed reaches the nominal torque. The described torque characteristic is shown by way of example in a diagram in FIG. 2a.

With a speed of the internal gear 14 that is determined by the drive machine 4 and a speed of the sun gear 13 that is required as dictated by operation, there is necessarily a speed to be set or a torque to be set on the planetary carrier 16, which can be controlled by the differential drive 5.

The planetary carrier 16 can, for example, be designed as one part or with several parts with components that are connected torsionally strong to one another. Since the torque on the planetary carrier 16 is high, it is advantageous to implement, for example, a transmission stage 17, 18 between the planetary carrier 16 and the differential drive 5. A spur gear stage, for example, is recommended for this purpose, the gear 17 being connected torsionally strong to the planetary carrier 16 and the gear 18 being connected to the differential drive 5. Alternatively, the transmission stage can, for example, also be multistage, or can be designed as a toothed belt, chain drive, planetary stage or as an angle gear. Instead of the transmission stage 17, 18, transmission gearing that can be continuously adjusted or adjusted optionally in steps can also be implemented.

FIG. 2 shows a differential drive 5 with a converter 6. Likewise, several differential drives can drive the planetary carrier 16, with which the torque of the transmission stage 17, 18 that is to be transmitted is distributed to these differential drives. In this case, the differential drives can be distributed uniformly or else asymmetrically over the periphery of the gear 17. Preferably—but not necessarily—the differential drives in this case are triggered by a common converter 6, then preferably one differential drive acting as a so-called "master" and the other differential drive(s) acting as (a) so-called "slave(s)." The differential drives can also be triggered by several motor-side rectifiers or inverters individually or in groups, these so-called motor-side rectifiers and inverters that are connected to the differential drives having preferably one common so-called power system-side rectifier or inverter that is connected to the power system 12 via a transformer 11 and that is joined via a DC intermediate circuit.

When the system is equipped with several differential drives, then preferably only one differential drive 5 is connected to the drive machine 4 via an auxiliary gear—as shown in FIG. 2. In this case, at least one second differential drive via planetary carrier 16 and transmission stage 17, 18 drives the auxiliary gear 20 in addition to the first differential drive 5. Thus, only one auxiliary gear 20 is necessary.

An auxiliary gear 20 is connected to the connection shaft 19 and subsequently to the drive machine 4 or the first drive of the differential system. This auxiliary gear 20 can be connected to the differential drive 5 by means of a clutch 22 and preferably also drives a lubricating oil pump 21. The clutch 22 can be positioned fundamentally anywhere between the differential drive 5 and the first drive of the differential system—i.e., also in one that is other than the stage of the auxiliary gear 20 nearest the differential drive 5. The clutch 22 is preferably designed as a claw clutch, a geared clutch, a multiple-disk clutch or as a trip-free mechanism. A trip-free mechanism (also called an overtaking clutch) is in this case a clutch that acts only in one direction of rotation. It can also be designed in the form of a self-synchronizing clutch. This is a trip-free mechanism in which the torque is transmitted via a geared clutch. The drive machine 4 can also be connected to an intermediate gear stage of the auxiliary gear 20, the connection of the auxiliary gear 20 to the first drive being maintained.

The differential drive 5 in the illustrated embodiment is separably connected to the transmission stage 17, 18 via a clutch 25. In order to start up the system, the differential drive 5 is connected to the transmission stage 17, 18 by engaging the clutch 25 and to the auxiliary gear 20 by engaging the clutch 22. By the differential drive 5 then being run up, thus the driven machine 1 and the drive machine 4 accelerate at the same time. In the case in which the clutch 22 is designed in the form of a trip-free mechanism, the latter automatically transmits the rotary motion of the differential drive 5 to the auxiliary gear 20 or the drive machine 4.

If the drive machine 4 is designed as an asynchronous machine, it is preferably brought to operating speed, and then the switch 23 is closed and the drive machine 4 is connected to the power system 12. The drive machine, when it is being connected to the power system 12, only briefly draws a magnetization current. The latter is higher than the nominal current of the drive machine 4, but is only present for a few power system periods and is far below the current that is being set and that the drive machine 4 would draw if it is switched to the power system under load. This magnetization current if necessary can be additionally reduced by using different recognized technical methods. Then, the clutch 22 is disengaged and the differential system works in the so-called differential mode. If the clutch 22 is designed as a trip-free mechanism, the connection is automatically broken as soon as the speed of the driving part (differential drive 5) becomes lower than the speed of the part that is to be driven (in FIG. 2, auxiliary gear 20) (compare also FIG. 4 in this respect). If the drive machine 4 is designed as a synchronous machine, according to recognized rules of technology, it can be synchronized with the power system and thus can be connected to the power system surge-free.

The differential drive 5 in this case helps to synchronize the drive machine 4 to the power system by its being able to control the speed and preferably also the phase angle of the drive machine 4 and to synchronize with the power system 12.

If the drive machine 4 is an internal combustion engine, it can be started with support of the differential drive 5.

In the case of a malfunction (for example, a power system failure), in the worst case both the drive machine 4 and also the driven machine 1 would run down in an uncontrolled manner. In order to protect the differential drive 5 operating in the differential mode against overspeed in such a case, either a brake 26 that acts on the second drive of the differential system and/or a brake 27 that acts directly on the differential drive 5 can be used. An alternative approach is to disengage the clutch 25 and in this way to separate the differential drive 5 from the remaining differential system.

If the clutch 22 is designed as a trip-free mechanism, its connection is automatically activated as soon as the speed of the driving part (auxiliary gear 20) becomes lower than the speed of the part to be driven (differential drive 5), as a result of which an overspeed of the differential drive 5 is automatically prevented. Thus, when using a trip-free mechanism as the clutch 22 for the operating modes "start up" and "differential operation" or "malfunction," neither the clutch 25 nor the brakes 26 and 27 are necessary.

If the clutch 22 is designed as a multiple-disk clutch, in the case of a malfunction, it is preferably then activated when the speed difference between the output shaft of the auxiliary gear 20 and the differential drive 5 is a minimum (ideally at a speed difference of roughly zero).

In another embodiment of the invention, the brake 26 can also be used to brake the second drive of the differential system during the described start-up process in order to avoid an isochronous acceleration of the planetary carrier 16. Here, the clutch 22 remains engaged and the clutch 25 disengaged. Thus, the driven machine 1 can be operated away from a working speed equal to zero. The maximum attainable drive output for the driven machine 1 is, however, limited according to the output capacity of the differential drive 5. However, since operation, for example, of a boiler water feed pump also comprises operating modes with a low speed (lower than the attainable working speed in the differential mode) and low output or else maintenance-dictated start-ups, they can be implemented by this embodiment.

A similar result is achieved by braking the first drive with a brake (in the case of FIG. 2, for example, with a brake 28 on the drive machine 4). The clutch 25 in this application is engaged and the clutch 22 disengaged. Thus, with the internal gear 14 at a standstill, the planetary carrier 16 and subsequently the driven machine 1 can be driven with the differential drive 5. Another application for such a brake 28 is to slow down the drive machine 4 in parallel to the driven machine 1 in the case of a malfunction in order to prevent an overspeed on the differential drive 5.

As FIG. 1 and FIG. 2 show, in a differential system, the first and second drives and the power take-off can be alternatively connected to an internal gear or a planetary carrier or a sun gear. In another variant according to the invention, the differential drive 5 is connected to the internal gear 14, the drive machine 4 is connected to the planetary carrier 16, and the driven machine 1 is connected to the sun gear 13. Other alternative combinations are likewise encompassed by the invention. The configuration that is shown in FIG. 2 shows one embodiment with which high speeds on the driven machine 1 can be easily and economically achieved. One exemplary configuration in which the driven machine 1 is connected to the internal gear 14, the drive machine 4 is connected to the sun gear 13 and the differential drive 5 is connected to the planetary carrier 16 is one possible variant embodiment for gearing down.

FIG. 3 shows another embodiment of a differential system according to the invention for high-speed drives. The differential system is structured fundamentally the same as described in FIG. 2. In contrast to FIG. 2, the transmission stage 29 is shown as a bevel gear transmission stage. Thus, the axis of rotation of the differential drive 5 is arranged with an angular offset to the axis of rotation of the drive machine 4 and the driven machine 1. This results in that an auxiliary gear 30 can also be designed as an angle gear. With the angular offset, the result is that the axial distance between the differential drive 5 and the driven machine 1 is increased and in this way, the driven machine 1 can be moved nearer the differential system. Likewise, the differential drive 5 can be located mirror-inverted in the direction of the drive machine 4 (compare FIG. 2 and FIG. 5) and thus the drive machine 4 can be moved nearer the differential system.

The auxiliary gear 30 can preferably be designed in the same manner as the auxiliary gear 20 such that (a) the direction of rotation of the driven machine 1 and the drive machine 4 is opposite and (b) the drive machine 4 preferably reaches its operating speed as soon as the differential drive 5 enters the region of its output limit.

The auxiliary gear 30 can be connected to the differential drive 5 by means of a clutch 31 and preferably also drives a lubricating oil pump 21. The clutch 31 can be positioned anywhere in the path between the differential drive 5 and the connection shaft 19, but is preferably located between the lubricating oil pump 21 and the differential drive 5 to ensure emergency operation of the lubricating system. If the differential drive 5 is located mirror-inverted to the direction of the drive machine 4, the first gear of the auxiliary gear 30 runs, for example, with a coupling capacity on the connection shaft between the differential drive 5 and the second drive of the differential system (compare FIGS. 2 and 5).

Fundamentally, the same applies to the execution and functions of the clutch 31 as to the clutch 22. The clutch 22, 31 can, moreover, also be designed as a hydrodynamic clutch/torque converter with additional/integrated blocking function and thus can also be used as an emergency braking system by its being engaged as soon as a malfunction occurs in the power train in the differential mode, and the differential drive 5 can be protected against overspeed (compare corresponding explanations to FIG. 2). Alternatively (or in addition), for example, a brake 27 that acts directly on the differential drive 5 can also be used. Fundamentally, according to the invention, however, any type of clutch can be used.

The clutch 34 that is shown in FIG. 3 is used first of all also like clutches 32 and 33 for connection of the driven machine 1, drive machine 4 and differential drive 5 to the transmission part of the differential system. If the use of a simple and economical clutch 31 is preferred, the clutch 34, as already described for FIG. 2, can be made detachable in operation (if necessary also with automatic disengagement at overspeed) in order to separate the differential drive 5—in case, for example, of a malfunction—from the second drive of the differential system. Thus, the brake 27 is also no longer fundamentally necessary. Alternatively, as already stated, instead of the clutch 31, a trip-free mechanism can be used that prevents an overspeed on the differential drive 5 in the event of a malfunction. This becomes possible in that in case of a fault in the differential mode (operating mode II), the speeds of the driven machine 1 and of the drive machine 4 always proceed in the direction of "lowest working speed" and thus the required free-running direction is defined accordingly.

The differential system is started up and operated up to its nominal operating point in three phases, as is explained with respect to FIG. 3. These three phases are the following:

Phase 1: The differential drive 5 is connected to the second drive of the differential system and is additionally connected to the first drive (incl. connecting shaft 19 and drive machine 4) of the differential system (in the case of a trip-free mechanism, it is automatically activated) by engaging the clutch 31 by means of the auxiliary gear 30. Then, the differential drive 5 is accelerated, and the driven machine 1 begins to work. Depending on the torque characteristic of the driven machine 1 (plus a so-called booster pump 69 that may be connected to the power train) and on the output of the differential drive 5, in this operating mode I preferably a continuously adjustable working speed from zero up to, for example, roughly 40%-50% of the nominal working speed of the driven machine 1 can be implemented. The power train is defined here as the entire drive train between the drive shaft 2 and the drive machine 4. The drive machine 4 remains in this operating mode I separated from the power system.

The transmission ratios of the gears 3, 29 and 30 that are active in this case are chosen such that the drive machine 4 reaches its operating speed as soon as the differential drive 5 enters the region of its power limit. That is to say, the differential drive 5 is designed such that it (a) can overcome the inherent breakaway torques of a power train and (b) in the operating mode I, a working speed is reached that lies in the region of a working speed that is as low as possible and that can be achieved in the differential mode (operating mode II). Preferably, a more or less large overlap of the working speed ranges of operating modes I and II is allowed, i.a., in favor of control hysteresis for the transition between operating modes I and II.

If the intention is to design the differential drive 5 to be as small as possible in terms of power, a working speed gap between operating modes I and II can also be provided. Here, however, when switching over between operating modes I and II, sudden torque and speed changes must be tolerated that can be equalized preferably by control engineering or else with dampers and/or clutches and/or hydrodynamic torque converters with additional/integrated blocking function—for example as clutch 31. If there is a working speed gap between operating mode I and operating mode II, the differential drive 5, as described above, cannot accelerate the drive machine 4 to its operating speed. The drive machine 4 is then switched to the power system 12 with a speed lower than its synchronous speed; this leads to corresponding current and torque surges. They are, however, smaller than if the drive machine 4 with a speed equal to zero is switched to the power system 12. The differential drive 5 is separated from the auxiliary gear in doing so, while the drive machine is being switched to the power system 12 (in the case of a trip-free mechanism, it is automatically deactivated) and "generates" a reaction torque on the second drive of the differential system.

The differential drive 5 in any case works as a motor in this first phase (operating mode I)—i.e., it takes power from the power system.

Phase 2: As soon as the drive machine 4 reaches its operating speed, as already described for FIG. 2, it is synchronized with the power system 12 and the switch 23 is closed.

Since the differential drive 5 works as a generator in the lower working speed range of operating mode II—i.e., it delivers power to the power system—in the next step, the torque of the differential drive 5 is adjusted from the motor mode that is required for operating mode I to the generator mode that is necessary first of all for operating mode II. In this way, the drive machine 4 is continuously more heavily loaded until the differential system preferably enters the lower region of the working speed range of operating mode II.

In order to keep system loads as small as possible, the transition from motor mode into generator mode of the differential drive takes place preferably attenuated, i.e., not suddenly.

Phase 3: As soon as the differential system has reached the operating point that was described for phase 2 in the lower working speed range of the operating mode II, the differential drive 5 is separated from the first drive of the differential system by either the clutch 31 being disengaged or, in the case of a trip-free mechanism, the connection being automatically broken (deactivated), as soon as the speed of the differential drive becomes lower. At this point, the system is operating in operating mode II (=differential mode), with which in this third phase for the driven machine 1, a maximum torque can be implemented at maximum drive speed.

In order to switch the differential system over from operating mode II to operating mode I—for example to turn off the driven machine 1 or for a smaller delivery rate—preferably the following sequence is recommended:

First, the lower region of the working speed range of operating mode II is triggered. After preferable synchronization of the two clutch halves (by means of speed control of the differential drive 5), the clutch 31 is engaged (if not executed as a trip-free mechanism). As the next step, the torque of the differential drive 5 is adjusted from the generator mode required for operating mode II into the motor mode that is required for operating mode I. In this way, the drive machine 4 is continuously relieved until it no longer delivers torque. By the switch 23 then being opened, the drive machine 4 can be smoothly separated from the power system 12. In the case of the execution of the clutch 22, 31 as a trip-free mechanism, it is automatically activated in this case. The differential system at this point is working in operating mode I and can thus be operated up to a working speed equal to zero.

FIG. 4 shows on a dimensionless time axis the behavior of the torque and the speed of the driven machine 1, the drive machine 4, the differential drive 5 and the clutch 22, 31 during the phases that were described for FIG. 3.

Phase 1: The complete differential system is at time T0. As soon as the differential drive 5 begins to turn, the driven machine 1 and the drive machine 4 also accelerate until the latter reaches its operating speed—in FIG. 4 labelled T1. The differential system works in operating mode I between time tags T0 and T1.

Phase 2: In the next step, the drive machine 4 that is working unloaded up to this instant is synchronized with the power system 12, and the switch 23 is closed at time T2.

Thereupon in the following step (between T2 and T3), the torque of the differential drive 5 is adjusted from motor mode to generator mode (the torque of the differential drive 5 changes the direction). In this way, the drive machine 4 is continuously more heavily loaded (the torque of the drive machine 4 rises) until the differential system preferably reaches one of the lower operating points of the working speed range of the operating mode II. By the resulting new load distribution in the differential system, the torque flowing originally via the clutch 22, 31 is adjusted toward zero and the clutch 22, 31 is disengaged or deactivated automatically in the case of a trip-free mechanism. At time T4, the phase 2 is thus completed.

The speeds for the drives and power take-offs of the differential system in phase 2 preferably remain essentially constant, but due to operation-dictated demands on the driven machine 1 or on the synchronization process of the drive machine 4, they can also vary. In this respect, overlapping of the working speeds of operating modes I and II is advantageous since in this way, possible speed fluctuations that occur between times T1 and T2 can be corrected and thus the drive machine 4 can be smoothly connected to the power system 12.

Phase 3: The differential system at this point works between times T4 and T6 in operating mode II (=differential mode). In doing so, the region between T4 and T5 shows a partial load range in which the system output is variably adjusted until it remains between T5 and T6, by way of example at nominal output with constant nominal torque and constant nominal speed (shown in FIG. 4, therefore, as a constant line). In the range between T4 and T5, the differential drive 5 changes from the generator mode to the motor mode; this becomes apparent in its speed ("differential drive" speed).

Operation of the differential system in operating mode II with a speed higher than nominal speed is fundamentally possible, the differential drive 5 then having to be operated in the field weakening region. In doing so, its torque is available only to a limited degree according to the known rules of engineering.

The speed of the drive machine 4 ("drive machine" speed) remains essentially constant in the operating mode II in the case of a three-phase machine.

If the clutch 22 or 31 is designed as a trip-free mechanism, activation/deactivation of the clutch 22, 31 is accomplished automatically, with which a flowing transition between the described phases/operating modes becomes possible.

The time relations of the time axis in FIG. 4 can be configured individually and depend on the design criteria of the differential system or on the operating demands.

The described operating concept also applies analogously to a generator mode of, for example, an energy extraction installation. In the case of using the system according to the invention in an energy extraction installation, the driven machine 1 is, for example, a wind power installation or a water turbine, and the drive machine 4 is an electrical machine that works essentially in the generator mode. Accordingly, the power flow is turned around in the entire drive train compared to the representations in FIG. 1 to FIG. 12 and their description. This also applies to, i.a., the control of the torque direction of the differential drive 5 between T2 and T3, which control is described here in FIG. 4.

If the differential system for a so-called pump turbine (driven machine is operating at times as a turbine and at times as a pump) is used, both a generator mode (turbine) and also a motor mode (pump) can be implemented with the system according to the invention, switching from one operating mode into the other being continuously possible. The transition from one operating mode (turbine) into the other (pump) in this case takes place preferably at time T0.

Fundamentally, the concept described here can also be expanded according to the functions and variant embodiments described in FIGS. 2 to 12.

FIG. 5 shows one embodiment of a differential system according to the invention for preferably slow-running drives. The principle derives from the explanations for FIGS. 1, 2 and 3 and can also be used for fast-running drives. The major difference from the concept according to FIGS. 2 and 3 is that the differential drive 5 is connected to the sun gear 9 as the second drive of the differential system (instead of the planetary carrier 16 in FIGS. 2 and 3), and the driven machine 1 is connected to the planetary carrier 7 (instead of the sun gear 13 in FIGS. 2 and 3).

The differential drive 5 can be connected to the auxiliary gear 20 by means of a clutch 22 and preferably also drives a lubricating oil pump 21. The clutch 22 can be positioned anywhere in the path between the differential drive 5 and the connection shaft 19, but is preferably located between the lubricating oil pump 21 and the differential drive 5 to ensure emergency operation of the lubricating system.

FIG. 6 shows another embodiment according to the invention, in which a differential drive 5 can be connected to the second drive and the power take-off of a differential system. In this embodiment, the differential drive 5 is, on the one hand, connected to the second drive of the differential system and, on the other hand, can be connected by means of a clutch 22 and via an auxiliary gear 61 to the power take-off of the differential system or the drive shaft 2. Fundamentally, the same applies as what was already described for FIGS. 2 to 5, only that the differential drive 5 drives both the drive shaft 2 and also the drive machine 4 via the planetary carrier 7 and the internal gear 8. There is a matching gear stage 60 in FIG. 6 for optimizing the speed control range of the differential drive 5.

FIG. 7 shows another embodiment according to the invention, in which a differential drive 5 of a differential system is connected to the second drive and can be connected to the power take-off. In contrast to the embodiment according to FIG. 6, here the second drive is connected to an internal gear 63, the first drive is connected to a planetary carrier 64 and the power take-off is connected to a sun gear 65. Accordingly, the differential drive 5 controls the speed of the drive shaft 2 via a transmission stage 66 and the externally toothed internal gear 63. For starting up, the differential drive 5 can be connected by means of the clutch 31 and an auxiliary gear 62 to the power take-off of the differential system. For operationally necessary braking processes, there is a brake 67 (in the illustrated embodiment shown symbolically as a disk brake), which is positioned in the region of the drive shaft of the drive machine 4, the brake shoes being connected to the drive machine 4 and the brake disk preferably to the clutch 33. If the clutch 33 is designed with overload protection (for example, a torque limiter), it should preferably be watched that this overload protection not lie in the primary load path of the braking torque in order thus not to limit a braking torque that can be transferred at maximum with it. The primary load path is in this case that path over which most of the braking torque of the brake 67 flows. One major advantage for the described positioning of the brake 67 on the drive machine 4 is that with it, the bearing of the first drive of the differential system remains free of possibly active transverse forces (due to non-uniformly acting braking forces).

FIG. 8 shows another embodiment according to the invention, in which a differential drive 5 of a differential system is connected to the second drive via an externally toothed internal gear 63 and can be connected to the first drive via the clutch 22 and auxiliary gear 68.

The embodiments according to FIGS. 6, 7 and 8 are especially well suited for use in energy extraction installations such as, for example, wind power plants as a driven machine 1. In this case, the drive machine 4 is an electrical machine, which works essentially in the generator mode. Accordingly, the power flow in the entire drive train is turned around (compare in this regard also the explanations for FIG. 4). The differential system is in this case preferably a part of a so-called primary gearing, the drive shaft 2 in most cases here being connected to the other gear stages of this primary gearing in order to achieve a low speed that is necessary for the driven machine at correspondingly high torque.

FIG. 9 shows another embodiment according to the invention, in which the power take-off can be connected to the first drive of a differential system. In this figure, the differential drive 5 is connected to the second drive, on the one hand, and, on the other hand, the power take-off of the differential system or, for example, the drive shaft 2 can be connected via an auxiliary gear 70 by means of the clutch 31 to the first drive of the differential system or subsequently the drive machine 4. Fundamentally, the same applies as already described for FIGS. 2 to 8, only that the differential drive 5 in operating mode I drives the drive machine 4 via the power take-off of the differential system or in the illustrated variant embodiment via the drive shaft 2 in addition.

FIG. 10 shows another embodiment according to the invention, in which the differential drive 5 can be connected to the first drive of the differential system via the second drive, transmission gearing 41 and an auxiliary gear 42.

FIG. 11 shows one embodiment of the differential system according to the invention with a so-called positive gear (also called an epicyclic gear transmission). Here, the drive shaft 19 of the first drive of the differential system is connected to a first sun gear 44, and the driven machine 1 is connected to a second sun gear 45. A planetary carrier 46 is equipped with two or more step planets 47, 48. Step planets are characterized by the planet gears each having two gears 47, 48 that are connected torsionally strong to one another and that have different pitch circle diameters. In the illustrated embodiment of the invention, the gear 48 interacts with the sun gear 44, and the gear 47 interacts with the sun gear 45. The differential drive 5 drives the planetary carrier 46 with variable speed. To implement the operating mode I, the planetary carrier 46 can be connected via a transmission stage 49 and an auxiliary gear 50 to the first drive of the differential system or the drive machine 4. The directions of rotation of the drive machine 4 and the driven machine 1 are the same here, and the transmission stage 49 in combination with the auxiliary gear 50 reverses the direction of rotation relative to the planetary carrier 46. The illustrated embodiment of a differential system in the form of a positive gear allows small transmission ratios between the drive machine 4 and the driven machine 1 and can also be economically produced due to the absence of internal gears.

FIG. 12 shows another embodiment of the differential system according to the invention in the form of a positive gear. Fundamentally, its operation derives from the comments on FIG. 11. In this embodiment, however, the auxiliary gear 52 can be connected to the transmission gear 51. In another embodiment according to the invention, the differential drive 5 is connected directly to the shaft 55.

As FIGS. 2 to 12 show by way of example, there is a host of possibilities according to the invention for implementing the operation of starting-up according to the invention. Fundamentally, it is always a matter of bridging the differential system, for example by means of an auxiliary gear 20, 30, 42, 50, 52, 53, 61, 62, 68, 70, so that the drive machine 4 reaches its operating speed as soon as the driven machine 1 reaches, for example, a lower working speed in the operating mode II. A more or less large overlap of the working speed range of operating modes I and II or a working speed gap can, however, be present, as explained. However, according to the invention in all embodiments, the drive machine 4 and the driven machine 1 are accelerated in parallel by means of the differential drive 5.

FIG. 13 shows another embodiment of a differential system according to the invention for an energy extraction installation. In the case of using the system according to the invention in an energy extraction installation, the drive machine 42 is an electrical machine that works essentially in the generator mode—preferably a separately-excited medium-voltage synchronous machine (see also explanations to FIGS. 4 and 8).

The driven machine 38 (for example, the rotor of a wind power plant) in this case drives the planetary carrier of a differential stage 40 via the primary gearing 39. The drive machine that was described in conjunction with FIGS. 1 to 12 is thus operated as a generator 42 in the working operation range. A differential drive 5 that is connected to the power system 12 via the converter 6 and the transformer 11 is connected by means of the shaft 35 (which is routed coaxially in a rotor hollow shaft 43 of the generator 42) to the second drive of the differential gear 40. The differential drive 5 can be connected to the rotor shaft 43 of the drive machine 42 by means of an auxiliary gear 53 and the clutch 54, the planetary carrier of the auxiliary gear 53 being connected torsionally strong to the housing of the generator 42 or being integrated into it. Fundamentally, the same applies to the execution of the clutch 54 as to the clutch 22, 31. The auxiliary gear 53 that is shown schematically as a planetary stage can also be replaced by one/several spur gear stage(s) or bevel gear stage(s). This applies in particular if according to AT 511 720 A, the differential system is designed with several differential drives that are connected via a spur gear stage. Fundamentally, however, any type of gearing or belt drives and the like can be used.

Instead of the differential drive 5, a hydrostatic actuating gear can be used. Here, the differential drive 5 and the converter 6 are replaced by a two-part or multiple-part hydrostatic pump/motor combination, which is connected to a pressure line and which is preferably adjustable in the flow volume. Thus, as in the case of a variable-speed electrical differential drive, the speeds can be adjusted. In doing so, a part of the pump/motor combination is preferably connected to the drive shaft 2, and/or by means of an electrical drive at least occasionally connected to the power system 12, and/or a part of the pump/motor combination is driven at times by some other drive unit.

This variant embodiment can also be used analogously as a differential drive when using a hydrodynamic torque converter.

The system according to the invention can also be used to operate the drive machine 4 or the generator 42 in the so-called phase shift mode. That is to say, the drive machine either as a motor 4 or as a generator 42 can deliver or draw reactive current into or out of the power system 12 without the driven machine 1 being operated. In doing so, the drive machine 4 or 42 is connected and synchronized preferably by means of the differential drive 5 only to the power system 12, and then the differential drive 5 is separated from the drive machine 4, 42 preferably by disengaging the clutch 22, 31, 54 without executing the other steps of the described start-up process. This takes place only when the driven machine 1 must take up operation.

The invention claimed is:

1. A power train, comprising:
   a drive shaft of a driven machine;
   a drive machine; and
   a differential gear comprising first and second drives and a power take-off, the power take-off being connected to the drive shaft, the first drive being connected to a drive machine and the second drive being connected to a differential drive,
   wherein one of the first and second drives, via an auxiliary gear, is simultaneously connected to an other one of the first and second drives or to the power take-off, and
   wherein the differential drive is connected, via a trip-free mechanism, to any of the first drive, the second drive, and the power take-off.

2. The power train according to claim 1, wherein the differential drive is connected simultaneously to the second drive and to one of the first drive and the power take-off.

3. The power train according to claim 2, wherein the differential drive is connectable to the second drive, and the second drive is connectable at a same time to the first drive.

4. The power train according to claim 1, wherein the first drive is connected to a brake.

5. The power train according to claim 1, wherein the driven machine is a pump, a compressor, fan, conveyor belt, crusher or a pulverizer.

6. The power train according to claim 1, wherein the driven machine is an energy extraction installation.

7. A method for starting up a power train that includes a drive shaft of a driven machine, a drive machine, and a differential gear with first and second drives and a power take-off, the power take-off being connected to the drive shaft, the first drive being connected to the drive machine, and the second drive being connected to a differential drive, said method comprising,
   starting up the drive machine from a speed of zero, while the differential drive is connected to the second drive and, via a trip-free mechanism, to one of the first drive and the power take-off; and
   subsequently interrupting a connection between one of the first and second drives and one of an other one of the first and second drives and the power take-off.

8. The method according to claim 7, wherein the drive machine, during said starting up, is an electrical machine and is separated from a power system.

9. The method according to claim 7, wherein the differential drive, when in a motor mode, simultaneously drives the second drive and the one of the first drive and the power take-off.

10. The method according to claim 7, wherein during the starting up, the driven machine is accelerated to a speed range of up to 40%-50% of a working nominal speed of the driven machine.

11. The method according to claim 7, wherein the drive machine is subsequently synchronized and connected to a power system.

12. The method according to claim 11, wherein the differential drive synchronizes a speed and a phase angle of the electrical machine is synchronized to the power system.

13. The method according to claim 11, wherein the differential drive changes from a motor mode to a generator mode after the drive machine is synchronized.

14. The method according to claim 7, wherein the second drive is braked or blocked while said second drive is separated from the differential drive.

15. The method according to claim 7, wherein the drive machine reaches an operating speed as soon as an output limit of the differential drive is reached.

16. The method according to claim 7, wherein the first drive is braked or blocked with a brake for operation of the driven machine in a low speed range, while the differential drive drives the second drive.

17. The method according to claim 7, wherein the second drive is braked or blocked with a brake for operation of the driven machine in a low speed range, while the differential drive drives the first drive.

18. The method according to claim 7, wherein in the event of a malfunction, the differential drive is connected to the first and second drive or the power take-off.

19. A power train, comprising:
a drive shaft of a driven machine;
a drive machine; and
a differential gear comprising first and second drives and a power take-off, the power take-off being connected to the drive shaft, the first drive being connected to a drive machine and the second drive being connected to a differential drive,
wherein one of the first and second drives is simultaneously connected to an other one of the first and second drives or to the power take-off,
wherein the differential drive is connected, via a trip-free mechanism, to any of the first drive, the second drive, and the power take-off, and
wherein the driven machine is a pump, a compressor, fan, conveyor belt, crusher or a pulverizer.

20. A power train, comprising:
a drive shaft of a driven machine;
a drive machine; and
a differential gear comprising first and second drives and a power take-off, the power take-off being connected to the drive shaft, the first drive being connected to a drive machine and the second drive being connected to a differential drive,
wherein one of the first and second drives is simultaneously connected to an other one of the first and second drives or to the power take-off,
wherein the differential drive is connected, via a trip-free mechanism, to any of the first drive, the second drive, and the power take-off, and
wherein the driven machine is an energy extraction installation.

* * * * *